United States Patent [19]

Meyer

[11] Patent Number: 4,458,782
[45] Date of Patent: Jul. 10, 1984

[54] TREE STAND SEAT

[76] Inventor: Darell L. Meyer, 1134 E. Cahal Ave., Nashville, Tenn. 37206

[21] Appl. No.: 497,184

[22] Filed: May 23, 1983

[51] Int. Cl.³ .................. A01M 31/02; A45F 3/26; A47C 9/10
[52] U.S. Cl. ................................. 182/187; 108/152
[58] Field of Search .................. 182/187, 188, 92; 108/152

[56] References Cited

U.S. PATENT DOCUMENTS

| | | | |
|---|---|---|---|
| 3,065,821 | 11/1962 | Hundley | 182/187 |
| 3,460,649 | 8/1969 | Baker | 182/187 |
| 3,485,320 | 12/1969 | Jones | 182/187 |
| 4,120,379 | 10/1978 | Carter | 182/187 |
| 4,230,296 | 10/1980 | Staley | 182/187 |
| 4,320,203 | 10/1980 | Sweat | 182/187 |
| 4,369,858 | 1/1983 | Babb | 182/187 |

Primary Examiner—Reinaldo P. Machado
Attorney, Agent, or Firm—Harrington A. Lackey

[57] ABSTRACT

A seat assembly particularly adapted for support upon the inclined side frame members of the Baker tree stand (U.S. Pat. No. 3,460,649). The seat assembly includes an elongated seat member transversely spanning the side frame members and being provided with depending legs resting upon the side frame members, and a pair of hanger straps affixed to the opposite ends of the seat member and projecting upward and rearward, and pin members selectively and detachably connecting the upper ends of the hangers members, behind the seat member, to a set of longitudinally spaced bolt holes in the side frame members.

8 Claims, 4 Drawing Figures

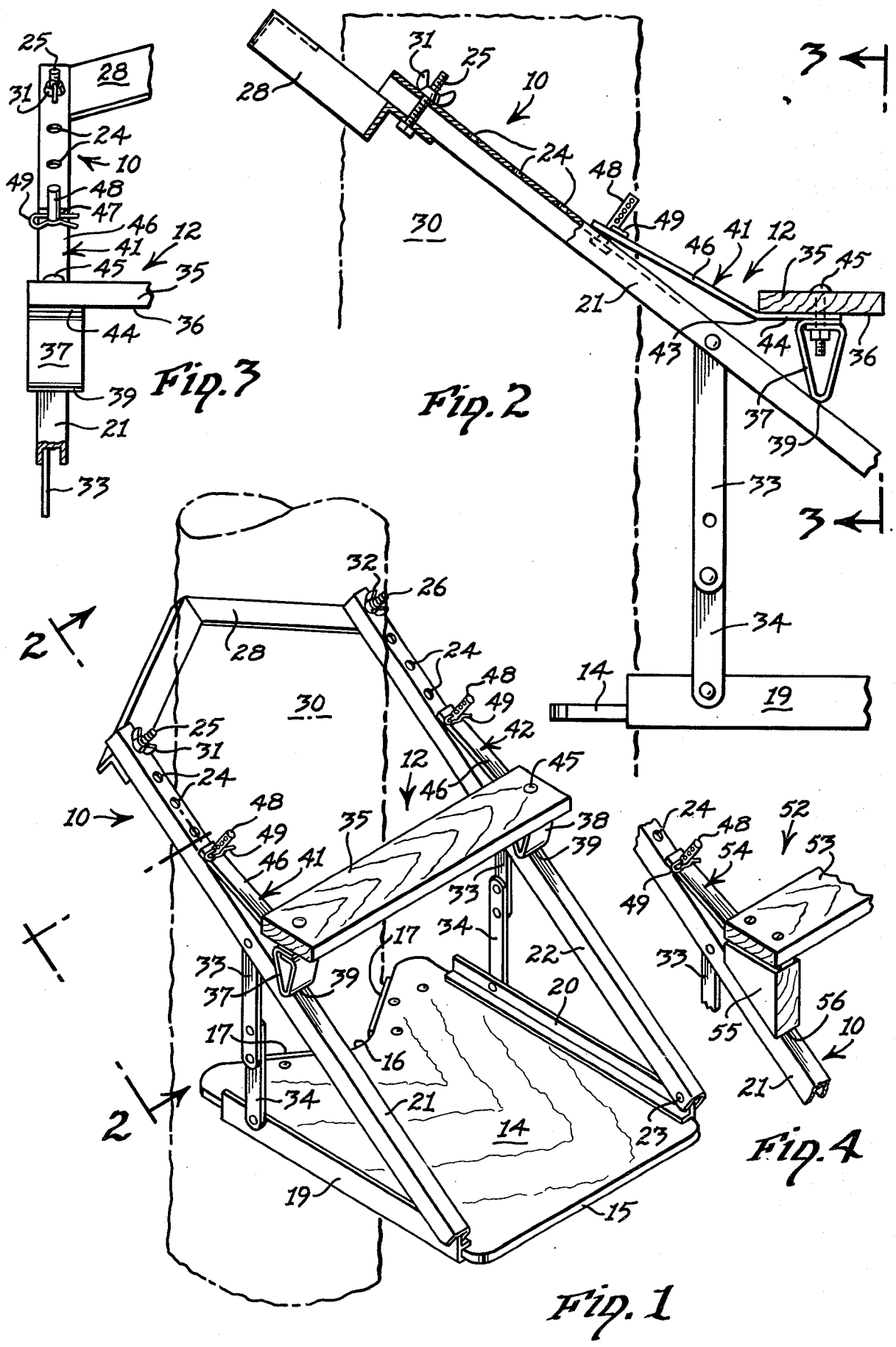

TREE STAND SEAT

BACKGROUND OF THE INVENTION

This invention relates to tree stands, and more particularly to a seat assembly for a tree stand.

Tree stands and tree climbing devices of various types are known in the art.

An example of a combination tree stand and climbing device is disclosed in the U.S. Baker et al Pat. No. 3,460,649, issued Aug. 12, 1969. The Baker tree stand and climbing device includes a platform or base plate having a rear edge adapted to engage the side of a tree. Pivotally connected to, and projecting rearwardly and upwardly from, the front end portion of the platform and on opposite sides of the tree are a pair of inclined parallel side frame members. Spanning the rear end portions of the side frame members behind the tree, is a V-shaped blade. The opposite ends of the V-shaped blade are detachably connected to the frame members by bolts and wing nuts registering with longitudinally spaced bolt holes through the side frame members, Thus, the V-shaped blade may be located in various longitudinally spaced positions for securing the tree stand to trees of different sizes.

Although the Baker tree stand is widely used by hunters for climbing and positioning themselves at elevated positions in trees for observing and hunting game, nevertheless, the platform of the Baker tree stand is the only support for the hunter either in a standing or sitting position. While the hunter uses the platform for sitting, his feet must either hang free or be supported by a flexible rope suspended from the platform. Such a sitting position can become quite uncomfortable, particularly for sustained periods and in inclement weather conditions.

Tree stands have been designed which include, not only a standing platform, but also a seat member, permitting the hunter to sit down and rest his feet on a platform while the tree stand is suspended upon the tree in an elevated position. Examples of such combined tree stands are disclosed in the following U.S. Pat. Nos.

3,065,821—Hundley, Jr.; Nov. 27, 1962
3,485,320—Jones; Dec. 23, 1969 (FIG. 2)
4,120,379—Carter; Oct. 17, 1978
4,230,203—Sweat et al; Oct. 28, 1980

In the Hundley, Jr. patent, both the seat and the platform have tree engaging edges and the seat is independently suspended about the tree by a strap. Moreover, the seat is provided with a rearward declining pointed brace member for supporting the seat in a horizontal position, and the platform is suspended from the seat.

In the Jones patent 3,485,320, the seat 60 (FIG. 2) is an elongated flexible piece of fabric, such as canvas, provided with slings at opposite ends terminating in hooks which engage over the top of the horizontal upper side frame bars.

In the Carter patent 4,120,379, both the seat member and the platform are fixed to rearwardly extending bars which are hinged to an upright frame member supported upon the tree, and the front edges of the seat member in the platform are suspended by cables or ropes from the frame member.

Sweat's seat member is completely independent of the platform member and separately and independently supported upon the tree. The only cooperation between the seat member and the platform member of the Sweat apparatus is through the body of the hunter as he manipulates the seat member and the platform member.

None of the above prior patents disclose a seat assembly particularly constructed and adapted to fit upon and be supported by a tree stand of the type disclosed in the Baker et al patent 3,460,649.

SUMMARY OF THE INVENTION

It is therefore an object of this invention to provide a seat particularly constructed for assembly upon the Baker tree stand, as depicted in U.S. Pat. No. 3,460,649.

The seat assembly made in accordance with this invention is particularly adapted to rest upon the upwardly, rearwardly, inclined side frame members of the Baker tree stand, and is adapted to be adjustably positioned along the frame members.

Furthermore, the seat assembly made in accordance with this invention includes hanger members particularly adapted to be connected to the side frame members of the tree stand by pins registering with the existing bolt holes in the side frame members, normally utilized for securing the tree-engaging blade. The hanger members are also adapted to locate the seat member in front of the tree while still being connected to the rear portions of the side frame members on opposite sides of the tree, when the tree stand is mounted on the tree.

The seat assembly made in accordance with this invention is also particularly adapted to utilize the maximum bearing support afforded by the existing tree stand. Leg members fixed to opposite ends of the seat member include bottom bearing surfaces resting directly upon the top surfaces of the inclined frame members to support the seat member in a transverse horizontal position spanning the frame members to adequately support the weight of the hunter and his clothes and equipment.

Specifically, the seat assembly includes an elongated seat member long enough to span the rearwardly inclined parallel side frame members of the tree stand, with depending legs having bearing surfaces for engaging the top surfaces of the side frame members without becoming displaced when inadvertently laterally shifted. A pair of hanger strap members having their front end portions securely fixed to the seat member project upward and rearward for attachment to the upper portions of the side frame members by appropriate pins and connectors.

BRIEF DESCRIPTION OF THE DRAWINGS

FIG. 1 is a top front perspective view of the seat assembly, made in accordance with this invention, supported in operative position upon a Baker tree stand, with the tree shown in phantom;

FIG. 2 is an enlarged, fragmentary section taken along the line 2—2 of FIG. 1;

FIG. 3 is a fragmentary section taken along the line 3—3 of FIG. 2; and

FIG. 4 is a fragmentary, top front perspective view of a modified seat assembly in operative seating position upon a Baker tree stand.

DESCRIPTION OF THE PREFERRED EMBODIMENT

Referring now to the drawings in more detail, FIGS. 1-3 disclose a "Baker" tree stand 10 made generally in accordance with the teaching of the U.S. Baker Pat.

No. 3,460,649, upon which is mounted the seat assembly 12, made in accordance with this invention.

The Baker tree stand includes a substantially rectangular planar base plate or platform 14 having a front edge 15 and a V-shaped rear edge 16. The rear edge 16 may be provided with a pair of tree-engaging blades 17.

Extruded side bars 19 and 20 are fixedly secured to the side edges of the platform 14. The front end portion of each side bar 19 and 20 hingedly supports the front ends of the corresponding side frame members 21 and 22 by pivot pins 23. As disclosed in the drawings, the side frame members 21 and 22 are elongated, straight, and parallel to each other and have channel-shaped cross sections opening downward. Each of the upper end portions of the side frame members 21 and 22 is provided with a plurality of longitudinally spaced, generally vertical disposed, bolt holes 24 for receiving the respective bolts 25 and 26 extending through the opposite end portions of a V-shaped blade member 28. The blade member 28 has a sharpened inner or front edge for engaging the opposite side of the tree 30 from the blades 17 on the rear edge 16 of the platform 14. The bolts 25 and 26 may be secured in place by the respective wing nuts 31 and 32. By releasing one or more of the wing nuts 31 and 32, the bolts 25 and 26 may be removed, and the V-shaped blade 28 may be re-positioned and re-secured at different longitudinal locations along the frame members 21 and 22, in order to accommodate trees 30 of different sizes.

The frame members 21 and 22 may be secured in their operative inclined or angular positions relative to the platform 14 by means of hinged toggle struts 33 and 34, pivotally connected to each other and also to the corresponding side bars 19 and 20 and side frame members 21 and 22. In this manner, frame members 21 and 22 may be easily folded about their pivot pins 23 by disaligning the hinged struts 33 and 34, so that the frame members 21 and 22 collapse upon the platform 14, for economy of space in transporting and storing the tree stand 10.

The seat assembly 12 made in accordance with this invention includes an elongated seat member 35, preferably rectangular and having a length at least as great as the spacing between the pair of frame members 21 and 22, so that the seat member 35 will easily span the frame members 21 and 22. The seat member may be made of any convenient material, such as wood, metal or plastic.

Fixed to the bottom surface 36 of each end portion of the seat member 35 is a depending leg member 37 and 38. The particular leg members 37 and 38 disclosed in FIGS. 1–3 are made from a single strip of flat sheet metal, such as aluminum, bent back upon itself in the shape of a downward directed triangle and having a uniform width, preferably equaling at least the width of the top surface of the corresponding side frame members 21 and 22. Thus, the bottom bearing surface 39 of each leg member 37 and 38 will be at least as wide as, and preferably slightly wider than, the top surface of the corresponding side frame members 21 and 22 to permit inadvertent lateral shifting of the seat member 35 relative to the side frame members 21 and 22, without the leg members 37 and 38 disengaging their respective side frame members 21 and 22.

Also fixed to the bottom surface 36 of the opposite end portions of the seat member 35 are respectively, a pair of elongated hanger members or hanger straps 41 and 42, preferably made of metal, such as aluminum or steel. Each hanger member 41 and 42 is bent or creased about the crease line 43 to form a straight flat front portion 44 adapted to fit flush against and between the bottom surface 36 and the top surface of the leg member 37. These three elements, the seat member 35, the front hanger portion 44 and the leg member 37, are secured together at each end of the seat member 35 by a corresponding single fastener, such as the bolt member 45.

The rear portion 46 of each hanger member 41 and 42 extends upward and rearwardly above and along each corresponding side frame member 21 and 22. The upper end portion of each rear hanger portion 46 is provided with a pin hole 47 (FIG. 3) adapted to receive a pin 48, which is also adapted to pass through one of the existing bolt holes 24. The pin 48 is retained in locked position, securing the upper hanger portion 46 to a corresponding frame member 21 and 22, by a cotter pin 49.

The rear hanger portions 46 are long enough to register their corresponding pin holes 47 with any of the transverse sets or pairs of existing bolt holes 24, and yet position the seat member 35 in front of the tree 30, when the tree stand 10 is supported upon the tree 30 in an operative position. The hanger members 41 and 42 permit the seat 35 to be positioned comfortably in front of the tree 30 so that the hunter may sit upon the seat 35 while resting his back against the tree 30, and still support his feet upon the platform 14 in a comfortable position.

Although most "Baker" tree stands 10 have an adequate number of bolt holes 24 already formed in the upper portions of the side frame members 21 and 22, nevertheless, additional holes 24 may be drilled to register with the pin holes 47 of the hanger members 41 and 42, if necessary to locate the seat member 35 in a comfortable position relative to the tree 30.

It will be noted that the seat assembly 12 may be easily attached and disconnected from the tree stand 10 by merely removing the cotter pins 49 and the pins 48, since these are the only elements which connect the seat assembly 12 to the tree stand 10.

Even though there may be some play between the pin holes 47 and their respective pins 48, nevertheless, the hanger members 41 and 42 are rigidly fixed to the seat member 35 and the leg members 37 and 38 so that relative movement, and particularly relative lateral shifting, between the seat assembly 12 and the frame members 21 and 22 is minimal. Nevertheless, the stability of the seat assembly 12 is maintained, even though there may be some slight lateral shifting, because of the wide bearing surfaces 39 on each leg 37 and 38 engaging and overlapping the substantially planar top surfaces or webs of the channel-shaped side frame members 21 and 22.

Even though the structure of the seat assembly 12 is relatively simple, nevertheless, the seat assembly 12 is totally supported by the side frame members 21 and 22 solely through the bearing surfaces 39 and the leg members 37 and 38 which rest entirely upon the side frame members 21 and 22 and which bear the entire vertical component of the weight of the seat assembly 12 as well as the weight of the hunter and his clothes and equipment. Any forward vectorial component of the weight of the hunter and his equipment is counter-acted by the connection between the pin members 48 and the registering pin holes 47 and bolt holes 24.

There are no forces of suspension exerted upon the seat member 35 except through the hanger members 41 and 42, which as previously mentioned, are subjected to only a small portion of the stress exerted by the lateral or forward vectorial components of the forces of the weight of the hunter and his equipment.

FIG. 4 discloses a slightly modified seat assembly 52 including a seat member 51 and hanger members 53 (only one of which is shown in FIG. 4) of substantially the same construction as their counterparts 41 and 42 in the seat assembly 12. In the seat assembly 52, each leg member 55 has the same relative position as the leg members 37 and 38, but is made of solid material, such as wood, and is provided with a bottom planar bearing surface 57 which provides a greater bearing surface for engaging the top surface of the side frame members 21 and 22. This greater bearing surface 56 will afford greater frictional surface for counteracting the forward vectorial components of the weight of the seat assembly 52 and the hunter and his equipment, thereby relieving some of the stress upon the connector pins 48.

What is claimed is:

1. In a tree stand, including a platform having a tree-engaging rear edge, a pair of side frame members extending angularly upward and rearward from the front portion of the platform, and a tree-engaging blade connected to the rear portions of the frame members for engaging the opposite side of a tree from the rear edge of the platform, in operative position, a seat assembly comprising:
    (a) an elongated seat member having a top surface and a bottom surface and a length at least as great as the transverse spacing between the frame members of the tree stand,
    (b) a pair of leg members fixed to and projecting downward from said seat member,
    (c) each of said leg members having a bottom bearing surface, said bearing surfaces being spaced apart transversely substantially the same distance as the spacing between the frame members,
    (d) a pair of hanger members attached to said seat member and having rear hanger portions extending beyond said seat member and resting on said pair of side frame members, and
    (e) connector means connecting said rear hanger portions respectively to corresponding frame members, behind said seat member, to hold said seat member in an operative seating position transversely spanning the frame members, so that said bearing surfaces rest on the corresponding angularly extending frame members.

2. The invention according to claim 1 in which each of said hanger members comprises an elongated strap member comprising said rear hanger portions and further comprising front portions, and securing means fastening said front portions to corresponding opposite portions of said seat member.

3. The invention according to claim 2 in which said securing means for said hanger members connect the front portions of said hanger members to the bottom surface of said seat member.

4. The invention according to claim 2 in which each hanger member is formed so that said front portion is at an angle to said rear hanger portion, and said front portion fits flush against a surface of said seat member, said rear hanger portion extending upward and rearward from said seat member in said seating position.

5. The invention according to claim 4 in which the front portion of each of said hanger members is disposed between the bottom surface of said seat member and said leg member, and said securing means fastens said seat member, said front portion and said leg member together.

6. The invention according to claim 1 in which each of said frame members comprises a top surface and a plurality of longitudinally spaced bolt holes extending through said top surface, said connector means comprising a connector pin for each hanger member extending selectively through one of said bolt holes and connected to a corresponding rear hanger portion.

7. The invention according to claim 6 in which the upper rear hanger portion of each hanger member comprises a pin hole for registry selectively with a corresponding bolt hole in said frame members, said connector pins being adapted to extend each through a registering bolt hole in a corresponding frame member and rear hanger portion, and means for locking said pins in said operative seating position.

8. The invention according to claim 1 in which said frame members have substantially planar top surfaces of uniform width, each of said bearing surfaces having a transverse dimension at least as great as the top planar surface of each corresponding frame member whereby said bearing surfaces rest substantially flush against the top surfaces of the corresponding side frame members in said operative seating position.

* * * * *